(12) United States Patent
Hayami et al.

(10) Patent No.: US 7,501,617 B2
(45) Date of Patent: Mar. 10, 2009

(54) DEVICE FOR TESTING A LIGHT-EMITTING OPTICAL DEVICE USING A SOCKET

(75) Inventors: Isao Hayami, Hyogo (JP); Toru Nishikawa, Osaka (JP); Masaya Tateyanagi, Shiga (JP); Syouichi Tanaka, Kyoto (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 11/374,093

(22) Filed: Mar. 14, 2006

(65) Prior Publication Data
US 2006/0208183 A1    Sep. 21, 2006

(30) Foreign Application Priority Data
Mar. 15, 2005    (JP)    ............................. 2005-072120

(51) Int. Cl.
*H01J 5/02*    (2006.01)
*H01J 40/14*    (2006.01)

(52) U.S. Cl. ...................... 250/239; 250/226; 356/218; 356/226

(58) Field of Classification Search ................ 250/221, 250/222.1, 225–226, 239; 356/213–236
See application file for complete search history.

(56) References Cited

U.S. PATENT DOCUMENTS

| | | | | |
|---|---|---|---|---|
| 3,881,825 | A * | 5/1975 | Chisholm | .................... 356/227 |
| 4,611,116 | A * | 9/1986 | Batt | ............................ 250/239 |
| 2005/0002028 | A1 * | 1/2005 | Kasapi et al. | ................ 356/328 |

* cited by examiner

*Primary Examiner*—Thanh X Luu
*Assistant Examiner*—Francis M Legasse, Jr.

(57) ABSTRACT

A tester according to the present invention can conduct a test on optical devices each having a different positional relation between a position of a contact face of an external contact terminal and a direction of light emitted from a semiconductor laser element.

13 Claims, 12 Drawing Sheets

F I G. 3
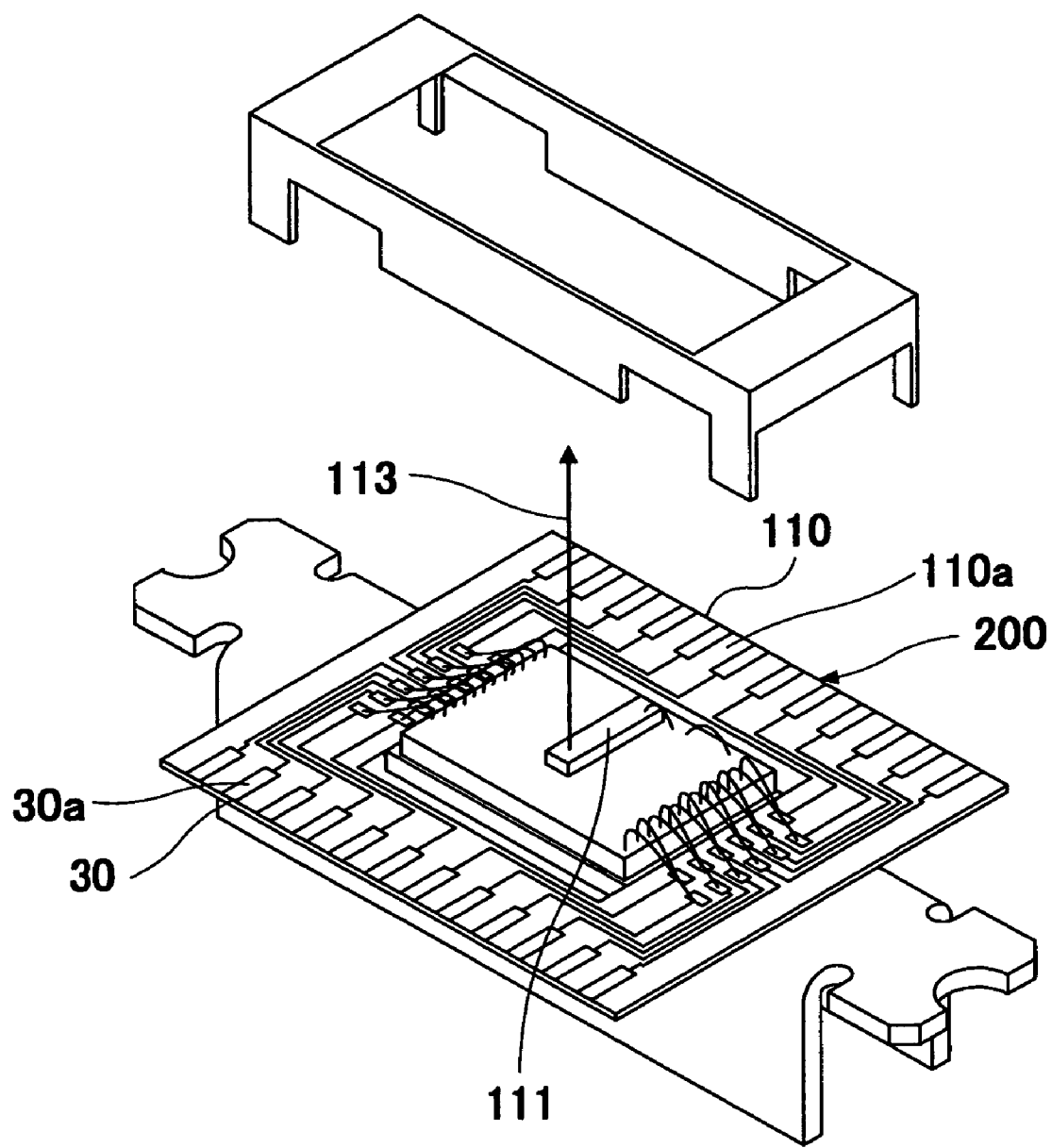

F I G. 10
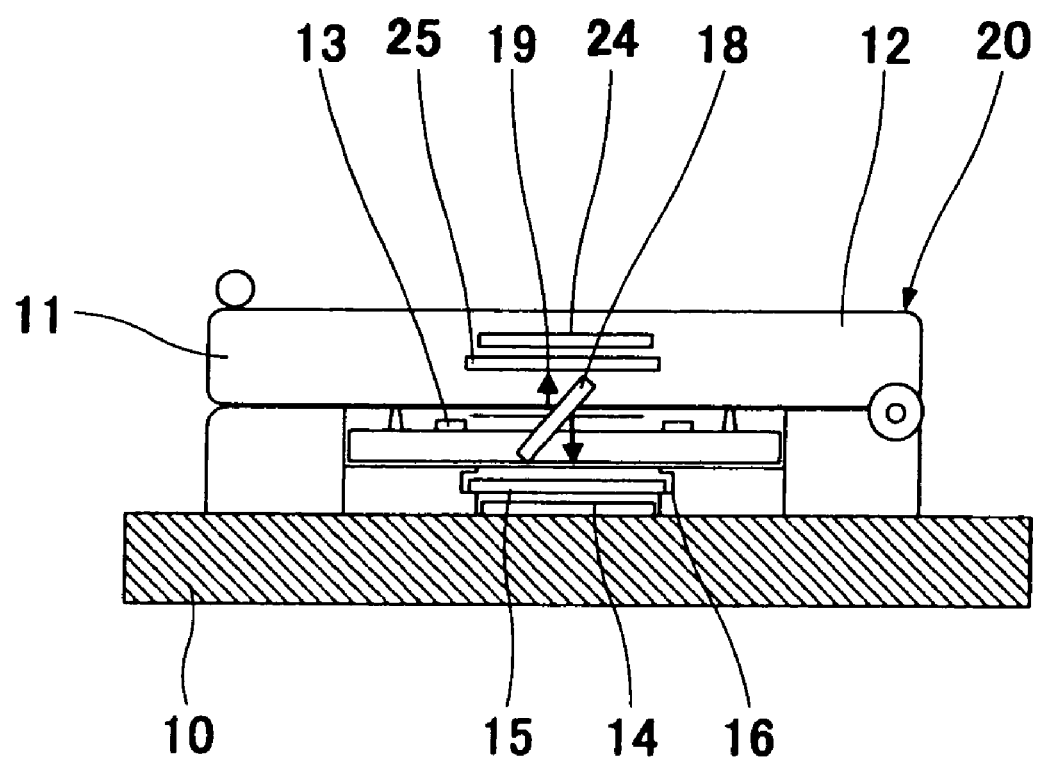

DEVICE FOR TESTING A LIGHT-EMITTING OPTICAL DEVICE USING A SOCKET

BACKGROUND OF THE INVENTION (1) Field of the Invention

The present invention relates to a tester for an optical device and, more particularly, to a technique for conducting a characteristics inspection in which an optical device is allowed to emit light and a light receiving element measures an output of the light.

(2) Description of the Related Art

In the field of optical discs, recently, there have been rapidly popularized optical disc drives for compact discs (e.g., CD-ROM, CD-R, CD-RW) and digital versatile discs (e.g., DVD-ROM, DVD-RW, DVD-DAM).

An optical pickup as a key component of an optical disc drive is strongly demanded to satisfy the following: high output in order to respond to high speed recording, enhanced function in order to conform to both specifications of a CD and a DVD, and size reduction in relation to size reduction of the optical disc drive.

Therefore, optical devices used in the optical pickup adopt various package structures, e.g., a package structure in which heat dissipation is improved for realizing high output, a multi-pin structure for responding to enhanced function, and a package structure with narrow width, for realizing size reduction.

In order to conduct a test on these optical devices, a tester must respond to the various package structures.

FIG. 11 is a sectional view of a conventional optical device. FIG. 12 is a sectional view of a conventional tester for conducting a test on an optical device.

An optical device 100 illustrated in FIG. 11 includes a lead frame 110 in which a semiconductor laser element 111 and a resin frame body 112 are provided. In the optical device 100, an external connection terminal is provided on a bottom face of the lead frame 110 and the semiconductor laser element 111 emits outgoing light 113 upward from a top face of the lead frame 110.

The tester illustrated in FIG. 12 includes a socket base 11 mounted on a first board 10, and a cover 12 coupled to the socket base 11 in an openable/closable manner. The socket base 11 is used for placing thereon the optical device 100 illustrated in FIG. 11, and has a terminal 13 on its top face. The terminal 13 comes into contact with the external connection terminal provided on the bottom face of the optical device 100.

The cover 12 incorporates therein a second board 17 on which a light receiving element 14 and an optical filter 15 are provided. The light receiving element 14 is used for measuring output of outgoing light emitted from the semiconductor laser element 111 of the optical device 100. The optical filter 15 is used for attenuating the output of the outgoing light emitted from the semiconductor laser element 111. The light receiving element 14 is electrically connected to the first board 10 through the second board 17 and a flexible substrate (not illustrated).

A characteristics test for the optical device 100 is conducted as follows. First, the optical device 100 is placed on the socket base 11, and the terminal 13 of the socket base 11 is brought into contact with the external connection terminal provided on the bottom face of the optical device 100. Then, the cover 12 is closed, and the optical device 100 is put in the tester so as to be interposed between the socket base 11 and the cover 12.

The tester in which the optical device 100 is put is placed in a thermostatic furnace kept at a constant temperature. In this state, an electric current is supplied to the optical device 100 through the first board 10, so that the semiconductor laser element 111 is allowed to emit light. In the optical device 100, the semiconductor laser element 111 emits the outgoing light 113 upward, i.e., toward the light receiving element 14 incorporated in the cover 12. At the constant temperature, the light receiving element 14 receives the outgoing light 113 emitted from the semiconductor laser element 111 to thereby measure output of the outgoing light 113.

Herein, a driving current to be supplied to the optical device 100 is controlled to keep the output of the light constant and allow to emit the light over a predetermined period of time. Then, an amount of change in the driving current during the period of time is measured and, on the basis of the result of measuring the change amount, electrical characteristics of the optical device 100 are assayed. For example, JP10-19663A discloses a conventional technique for such a tester.

However, the aforementioned tester for an optical device has the structure that the terminal 13 coming into contact with the external connection terminal of the optical device 100 is provided on the top face of the socket base 11 and the light receiving element 14 is incorporated in the cover 12 provided so as to oppose the top face of the socket base 11. Therefore, the tester has a problem of limitation in type of optical devices to be measured. In other words, the aforementioned tester can measure only an optical device having a structure that an external connection terminal is provided on a bottom face of the optical device and a semiconductor laser element emits light upward from a top face of the optical device.

At present, there are various types of optical devices, e.g., an optical device in which an external connection terminal is provided on a top face of the optical device and light is emitted upward from the top face of the optical device, and an optical device in which light is emitted sideward along a top face of the optical device. Therefore, it is necessary to provide a dedicated tester for each optical device. However, it is difficult to provide a dedicated tester for each optical device from the viewpoint of cost reduction.

SUMMARY OF THE INVENTION

The present invention has been made for solving the aforementioned problems, and it is an object of the present invention to provide a tester usable for various optical devices differing from one another in a relation between a face on which an external connection terminal is provided and a direction of light emission.

In order to achieve the aforementioned object, a tester for an optical device according to the present invention comprises a socket for placing thereon an optical device, a light receiving element for measuring an output of light emitted from the optical device, and a first board for mounting thereon the socket. Herein, the socket includes a socket base and a cover, the socket base including, on its top face, a terminal coming into contact with an external connection terminal of the optical device and having a through hole for allowing the light emitted from the optical device to pass therethrough, and the light receiving element is mounted on a top face of the first board at a position corresponding to the through hole of the socket.

With this configuration, it is possible to conduct a characteristics test on an optical device in which a position of a contact face of an external connection terminal and a direction of emission of outgoing light are on the same plane and an angle formed by the contact face of the external connection terminal with a light emission face is 0°, i.e., the contact face of the external connection terminal is parallel to the light emission face.

In this characteristics test, the outgoing light emitted from the optical device reaches the light receiving element mounted on the first board through the through hole. The characteristics test is conducted in such a manner that the light receiving element measures the output of the light emitted from the optical device.

In the tester for an optical device according to the present invention, the socket base holds, at a midpoint of the through hole, an optical filter interposed between the optical device and the light receiving element.

With this configuration, the outgoing light emitted from the optical device reaches the light receiving element mounted on the first board through the through hole and the optical filter.

In the tester for an optical device according to the present invention, the socket base holds, at the midpoint of the through hole, a groove for holding therein the optical filter in an attachable/detachable manner.

Outgoing light emitted from an optical device has a different magnitude of output and a different wavelength in accordance with an optical element, e.g., a laser element mounted on the optical device; therefore, an optical filter must be exchanged in accordance with the type of the optical device. Accordingly, the socket base has the groove for holding the optical filter in an attachable/detachable manner, so that the optical filter can be readily exchanged.

The tester for an optical device according to the present invention further comprises a reflection mirror provided between the optical device and the light receiving element.

With this configuration, it is possible to conduct a characteristics test on an optical device of a different type in which a contact face of an external connection terminal is positioned on a bottom face of the optical device, light is emitted sideward along a top face of the optical device, and an angle formed by the contact face of the external connection terminal with a light emission face is 90°.

In this characteristics test, the outgoing light emitted from the optical device is reflected by the reflection mirror, travels toward a bottom face of the socket, and reaches the light receiving element mounted on the first board through the through hole and the optical filter.

Accordingly, optical devices each having a different positional relation between the position of the contact face of the external connection terminal and the direction of light emission, can be subjected to a test by means of a single tester, resulting in cost reduction.

The tester for an optical device according to the present invention further comprises an optical prism provided between the optical device and the light receiving element.

With this configuration, the outgoing light emitted from the optical device is reflected by the optical prism, travels toward a bottom face of the socket, and reaches the light receiving element mounted on the first board through the through hole and the optical filter.

Accordingly, optical devices each having a different positional relation between the position of the contact face of the external connection terminal and the direction of light emission, can be subjected to a test by means of a single tester, resulting in cost reduction.

In the tester for an optical device according to the present invention, the socket base has a second optical filter and a second light receiving element each placed on a side portion of the top face thereof, and the second light receiving element is mounted on the first board.

With this configuration, the outgoing light emitted from the optical device reaches the second light receiving element through the second optical filter held at the side portion of the socket base.

Accordingly, optical devices each having a different positional relation between the position of the contact face of the external connection terminal and the direction of light emission, can be subjected to a test by means of a single tester, resulting in cost reduction.

In the tester for an optical device according to the present invention, the socket base has a second optical filter and a second board each placed on a side portion of the top face thereof, the second board has a second light receiving element mounted thereon, and the socket base has a groove for holding therein the second optical filter and the second board in an attachable/detachable manner.

With this configuration, the second board for mounting thereon the light receiving element can be readily detached from the socket base; thus, it is possible to readily perform maintenance and exchange upon finding a failure of a light receiving element.

In the tester for an optical device according to the present invention, the cover includes a separate light receiving element and a separate optical filter each provided at a position corresponding to the through hole.

With this configuration, optical devices of different types, e.g., an optical device in which an angle formed by a light emission face with a contact face of an external connection terminal is 0°, an optical device in which an angle formed by a light emission face with a contact face of an external connection terminal is 90°, and an optical device in which an angle formed by a light emission face with a contact face of an external connection terminal is 180°, can be subjected to a characteristics test by means of a single tester.

According to the present invention, optical devices of different types each having a different positional relation between a position of a contact face of an external connection terminal and a direction of light emission, can be subjected to a test by means of a single tester, without necessitating a dedicated tester for each optical device but by using the same tester as a common tester. Thus, the present invention attains an effect of cost reduction. Besides, this tester can be used for a characteristics inspection during manufacturing of an optical device.

BRIEF DESCRIPTION OF THE DRAWINGS

FIG. 3 is a perspective view of an optical device in which a contact face of an external connection terminal and a direction of light emission are on the same plane;

FIG. 10 is a sectional view of a tester for an optical device as a modification according to the third embodiment of the present invention;

DESCRIPTION OF THE PREFERRED EMBODIMENTS

Hereinafter, description will be given of embodiments of the present invention.

First Embodiment

Figure 11:
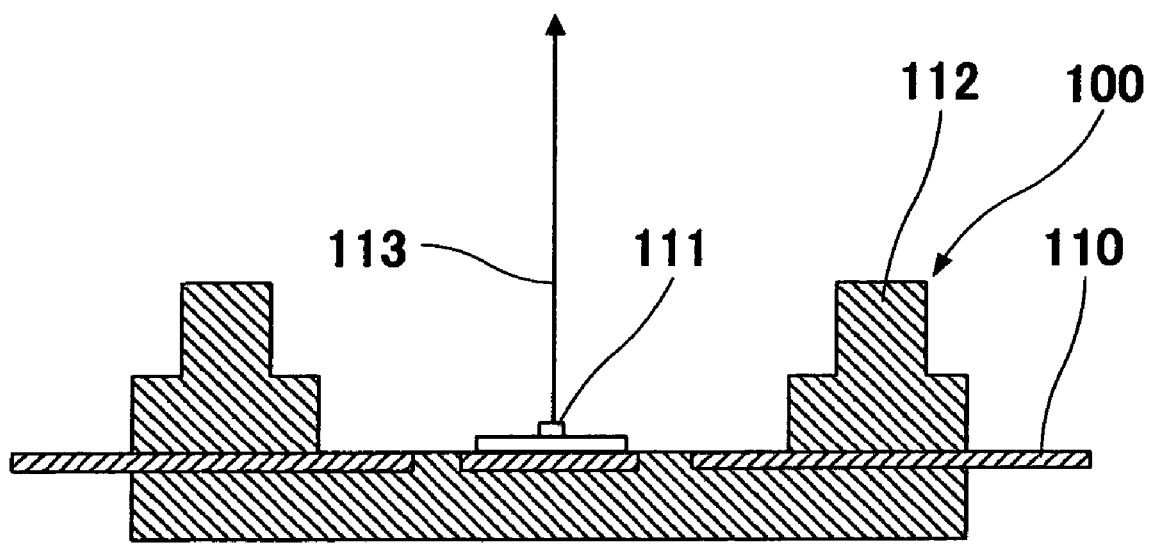
FIG. 11 is a sectional view of a conventional optical device.
Figure 12:
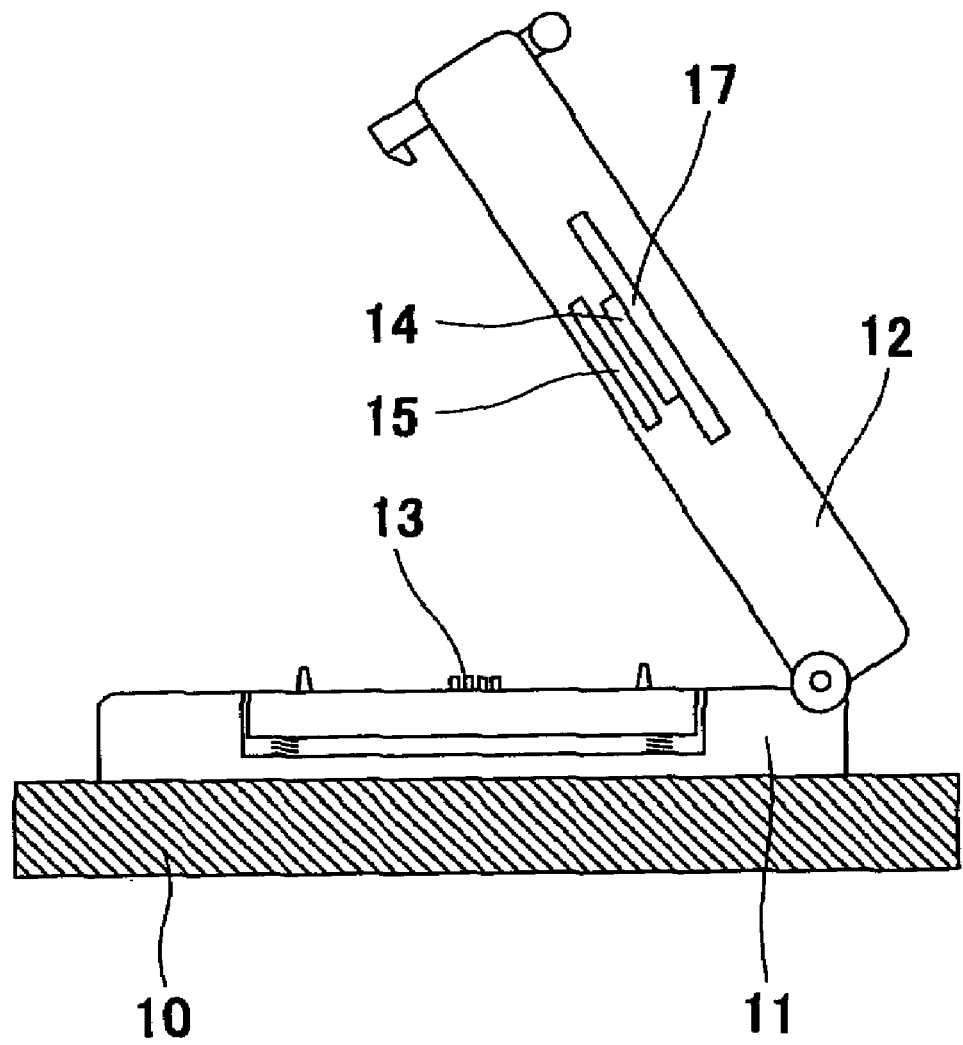
FIG. 12 is a sectional view of a conventional tester for an optical device.

Hereinafter, description will be given of a tester for an optical device according to a first embodiment of the present invention with reference to the drawings. Herein, essential components having the similar actions to those described above with reference to FIGS. 11 and 12 are denoted by the same reference numerals, and description thereof will not be repeated.

Figure 1:
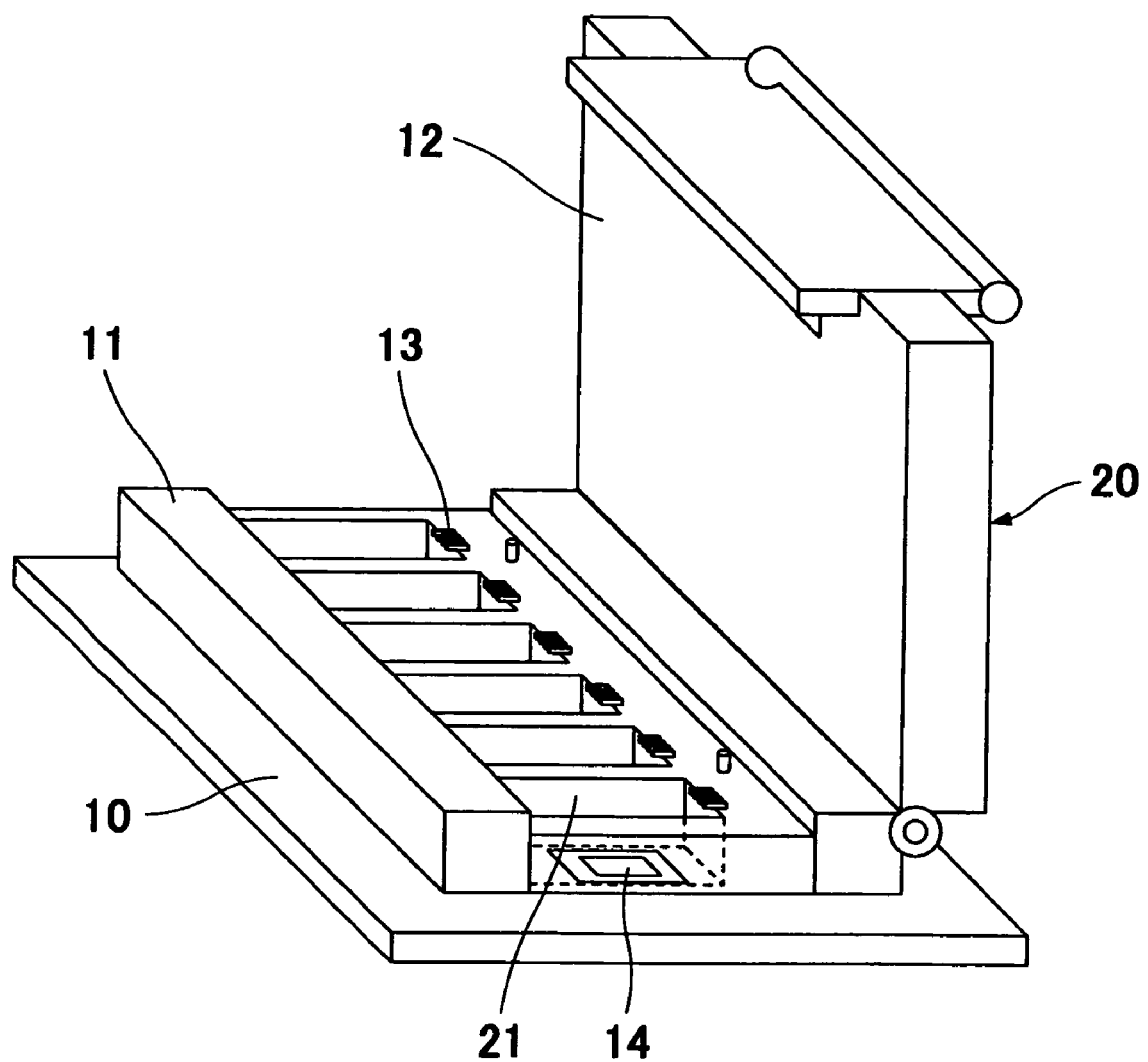
FIG. 1 is a perspective view of a tester for an optical device according to a first embodiment of the present invention.
Figure 2:
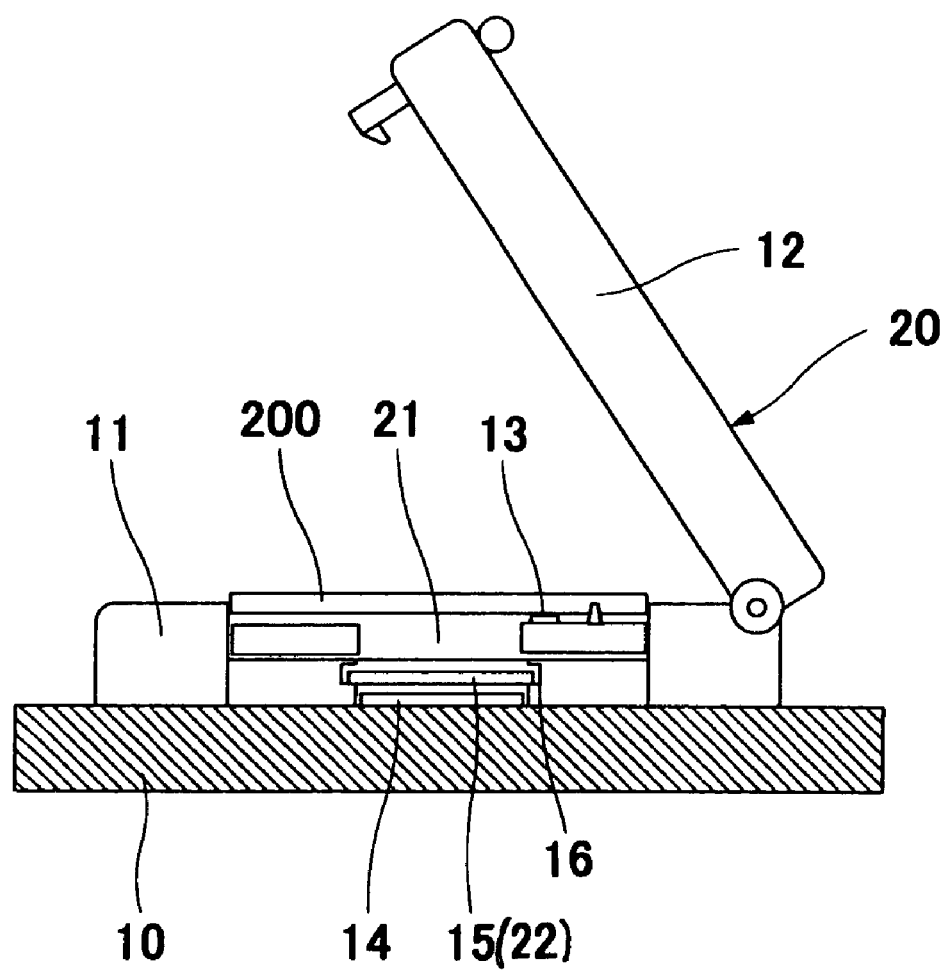
FIG. 2 is a sectional view of the tester for an optical device according to the first embodiment.

FIG. 1 is a perspective view of the tester for an optical device according to the first embodiment, and FIG. 2 is a sectional view of the tester.

As illustrated in FIGS. 1 and 2, the tester comprises a first board 10 and a socket 20 mounted on the first board 10. The socket 20 includes a socket base 11 and a cover 12.

The socket base 11 is used for placing thereon an optical device 200, and includes a through hole 21 through which light emitted from the optical device 200 passes, and a terminal 13 coming into contact with an external connection terminal of the optical device 200. The through hole 21 is open to the socket base 11 in a vertical direction from a top face of the first board 10 to a top face of the socket base 11, and the terminal 13 is provided on the top face of the socket base 11. A light receiving element 14 is mounted on the top face of the first board 10 at a position corresponding to the through hole 21.

In the socket 20, a plate-shaped optical filter 15 is interposed between the light receiving element 14 and the optical device 200. The optical filter 15 is inserted in a groove 16 formed in the socket base 11 in an exchangeable manner.

Alternatively, a prism 22 may be inserted between the optical device 200 and the light-receiving element 14.

Hereinafter, description will be given of operations of the tester configured as described above. As illustrated in FIG. 3, the optical device 200 has a configuration that a contact face 30a of an external connection terminal 30 is arranged on a top face 110a of the lead frame 110.

A semiconductor laser element 111 emits outgoing light 113 upward from the top face of the optical device 200, and a light emission face of the semiconductor laser element 111 is parallel to the contact face 30a of the external connection terminal 30. Consequently, the optical device 200 has a positional relation that an angle formed by the light emission face of the semiconductor laser element 111 with the contact face 30a of the external connection terminal 30 is 0°.

The optical device 200 is placed on the socket base 11. Herein, the optical device 200 is turned upside down so that the direction of emission of outgoing light 113 is directed to the light receiving element 14 of the first board 10 and, also, the contact face 30a of the external connection terminal 30 is brought into contact with the terminal 13 provided on the socket base 11. Then, the cover 12 is closed, and the optical device 200 is put in the tester so as to be interposed between the socket base 11 and the cover 12.

In this state, an electric current is supplied to the optical device 200 through the first board 10 and the terminal 13 so as to allow the optical device 200 to emit light. The outgoing light 113 from the optical device 200 is emitted toward the light receiving element 14 mounted on a bottom face of the socket base 11.

When the outgoing light 113 passing through the through hole 21 passes through the optical filter 15, output thereof is attenuated. The light receiving element 14 receives the attenuated outgoing light 113 and measures an electric current subjected to conversion; thus, a characteristics test for the optical device 200 can be conducted on the basis of the measured value.

With the tester according to the first embodiment, the terminal 13 is provided on the top face of the socket base 11 and the light receiving element 14 is provided on the top face of the first board 10. Therefore, even in a case that the optical device 200 has a structure that the light emission face of the semiconductor laser 111 and the contact face 30a of the external connection terminal 30 are on the top face of the optical device 200 and are parallel to each other, it is possible to conduct a characteristics test in which the light receiving element 14 measures output of light. Besides, this tester can be used in a characteristics inspection step upon manufacturing an optical device.

Herein, the optical filter 15 must attenuate output of light from the optical device 200 within a light reception permissible range of the light receiving element 14 in relation to a light transmittance thereof. Therefore, in order to select an optical filter 15 having a predetermined light transmittance, consideration must be given to magnitude of output of light emitted from the optical device 200 and wavelength dependence of a sensitivity of the light receiving element 14.

In the first embodiment, the optical filter 15 is inserted in the groove 16 provided in the socket base 11 and, therefore, is exchangeable. Thus, an optimal optical filter 15 can be used in accordance with magnitude of output of light emitted from the optical device 200.

Further, the cover 12 may include a separate light receiving element and a separate optical filter.

In this case, an optical device of a different type, i.e., an optical device in which a contact face 30a of an external connection terminal 30 is positioned on a bottom face of the optical device and a semiconductor laser element 111 emits light upward from a top face of the optical device can be subjected to a test in which a light receiving element incorporated in a cover 12 measures output of light.

Second Embodiment

Figure 4:
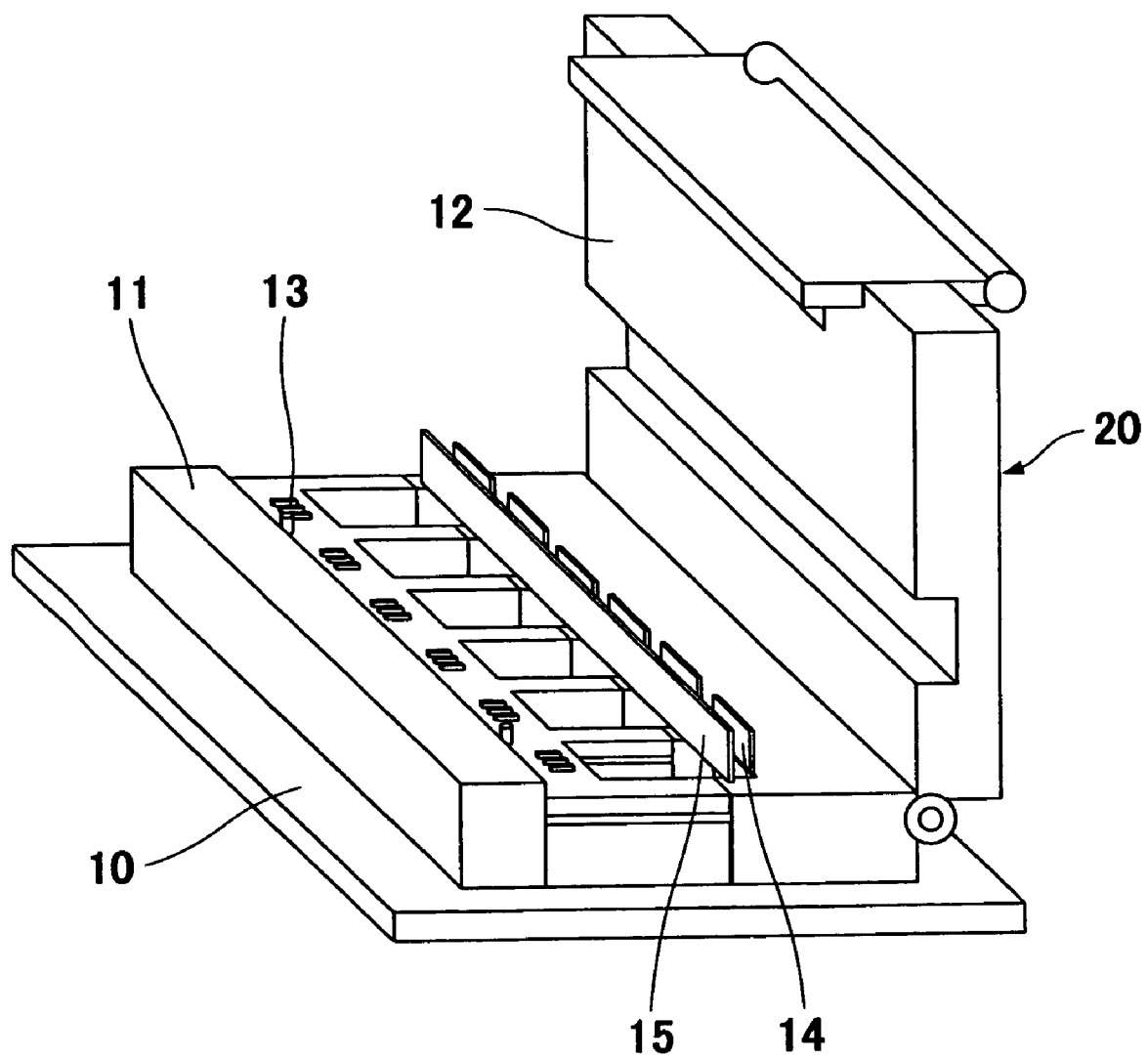
FIG. 4 is a perspective view of a tester for an optical device according to a second embodiment of the present invention.

Hereinafter, description will be given of a tester for an optical device according to a second embodiment of the present invention with reference to the drawings. FIG. 4 is a perspective view of the tester for an optical device according to the second embodiment, and FIG. 5 is a sectional view of the tester.

Herein, essential components having the similar actions to those described above with reference to FIGS. 11 and 12 as well as those in the first embodiment are denoted by the same reference numerals, and description thereof will not be repeated.

Figure 5:
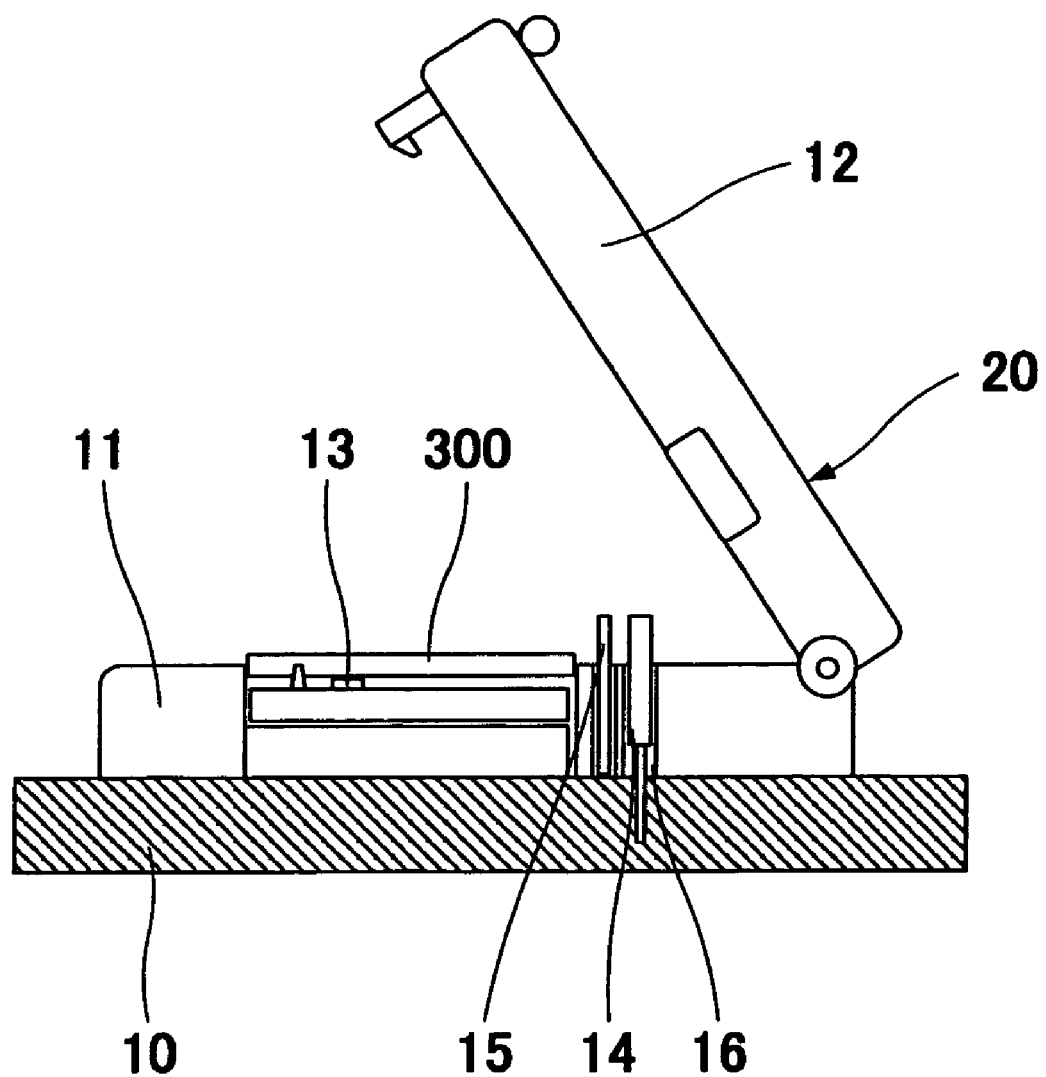
FIG. 5 is a sectional view of the tester for an optical device according to the second embodiment.

As illustrated in FIGS. 4 and 5, the second embodiment is different from the first embodiment in the following point. That is, the socket base 11 has the light receiving element 14 and the optical filter 15 on a side portion of the top face thereof. The socket base 11 has the terminal 13 and the groove 16 on its top face. The groove 16 is located in the side portion of the top face of the socket base 11 and is located at a position close to a coupling side of the socket base 11 and cover 12.

The plate-shaped optical filter 15 is inserted in an exchangeable manner in and held in an attachable/detachable manner by the groove 16. The light receiving element 14 such as a Sip-type package is mounted on the first board 10 so as to be inserted in the groove 16. With this configuration, the light receiving element 14 and the optical filter 15 are placed in a direction orthogonal to the top face of the socket base 11.

Figure 6:
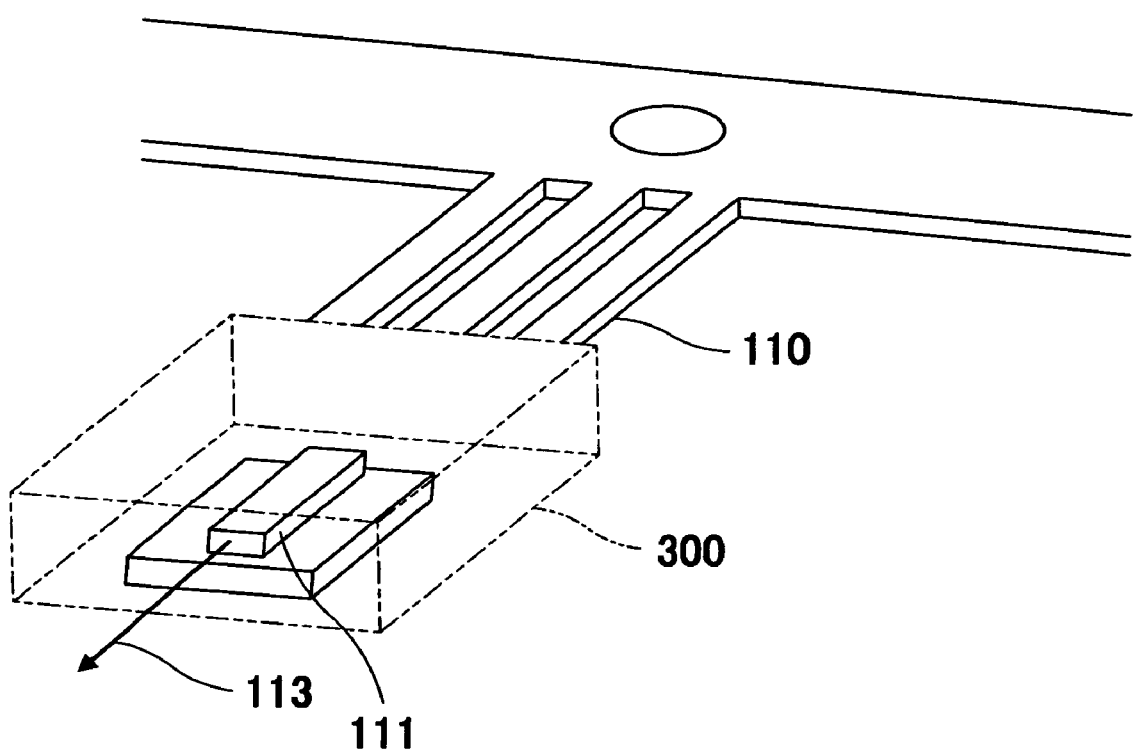
FIG. 6 is a perspective view of an optical device in which outgoing light is emitted sideway.

Hereinafter, description will be given of operations of the tester configured as described above. In an optical device 300 illustrated in FIG. 6, a semiconductor laser element 111 emits outgoing light 113 sideward along a top face of the optical device 300. In the optical device 300, a contact face 30a (not illustrated) of an external connection terminal 30 (not illustrated) is provided on a bottom face of the lead frame 110.

Consequently, the optical device 300 has a positional relation that an angle formed by a light emission face of the semiconductor laser element 111 with the contact face 30a of the external connection terminal 30 is 90°.

This optical device 300 is placed on the socket base 11. In the optical device 300, the outgoing light 113 is emitted to the light receiving element 14 of the first board 10 and the contact face 30a of the external connection terminal 30 is brought into contact with the terminal 13 provided on the socket base 11. Then, the cover 12 is closed, and the optical device 300 is put in the tester so as to be interposed between the socket base 11 and the cover 12.

In this state, an electric current is supplied to the optical device 300 through the first board 10 and the terminal 13 to thereby allow the optical device 300 to emit light. The outgoing light 113 from the optical device 300 is emitted toward the light receiving element 14 placed in the direction orthogonal to the top face of the socket case 11 and passes through the optical filter 15; thus, output thereof is attenuated. The light receiving element 14 receives the attenuated outgoing light 113 to measure an electric current subjected to conversion; thus, it is possible to conduct a characteristics test on the optical device 300 on the basis of the measured value.

With the tester according to the second embodiment, the terminal 13 is provided on the top face of the socket base 11 and the light receiving element 14 is arranged in a direction orthogonal to the top face of the socket base 11. Therefore, even in a case that the optical device 300 has a structure that the light emission face of the semiconductor laser 111 and the contact face 30a of the external connection terminal 30 are on the top face of the optical device 300 and are perpendicular to each other, it is possible to conduct a characteristics test in which the light receiving element 14 measures output of light. Besides, this tester can be used in a characteristics inspection step upon manufacturing an optical device.

In the second embodiment, the optical filter 15 is inserted in the groove 16 provided in the socket base 11 and, therefore, is exchangeable. Thus, an optimal optical filter 15 can be used in accordance with magnitude of output of light emitted from the optical device 300.

Figure 7:
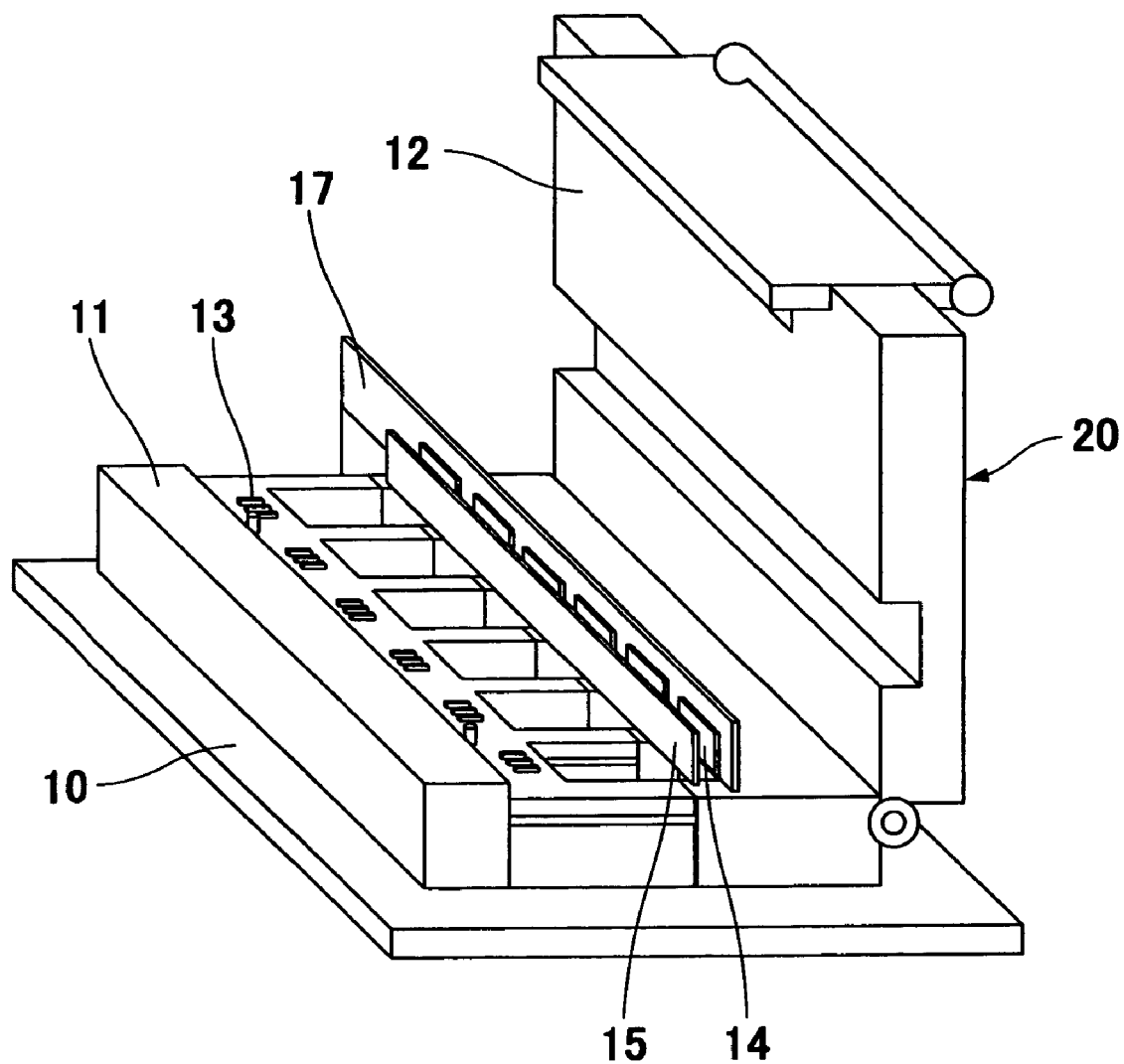
FIG. 7 is a perspective view of a tester for an optical device as a modification according to the second embodiment of the present invention.
Figure 8:
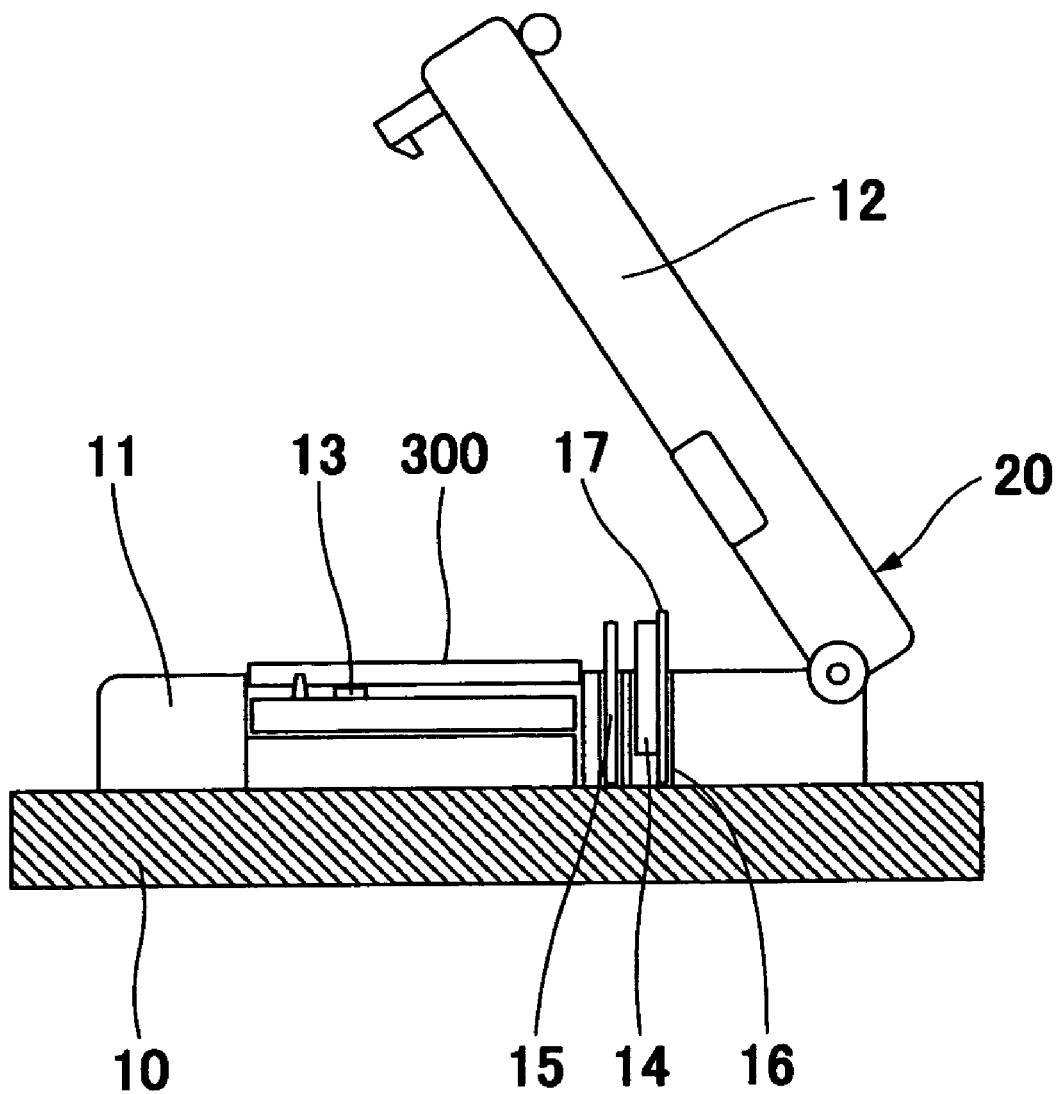
FIG. 8 is a sectional view of the tester for an optical device as the modification.

In addition, as illustrated in FIGS. 7 and 8, the light receiving element 14 may be exchangeable. In this case, a second board 17 is inserted in an attachable/detachable manner in the groove 16 provided in the socket base 11, and a light receiving element 14 such as a surface-mounted package is mounted on the second board 17. The second board 17 is electrically connected to the first board 10 through a flexible substrate, a connector or the like. With this configuration, it is possible to readily detach the second board 17 on which the light receiving element 14 is mounted and to readily perform maintenance such as an exchange of the light receiving element 14.

In the second embodiment, the groove 16 is provided on the top face of the socket base 11 and is located at a position close to a coupling side of the socket base 11 and cover 12. However, the groove 16 may be located at a position close to an open end side of the socket base 11 and cover 12 to hold the light receiving element 14 and the optical filter 15.

In addition, two grooves 16 may be provided on both sides of the socket base 11, i.e., may be located at a position close to the coupling side and a position close to the open end side. Each of the two grooves 16 holds a set of the light receiving element and optical filter.

In this case, optical devices are arranged in two rows on the lead frame in which the optical device of each row emits outgoing light 113 toward a light receiving element 14 and an optical filter 15 corresponding to the optical device of each row. With this configuration, a characteristics test can be simultaneously conducted on the optical devices arranged in two rows on the lead frame, resulting in improvement of productivity.

In the second embodiment, the socket 20 has the light receiving element 14 and the optical filter 15 on the side portion of the top face of the socket base 11, the light receiving element 14 has a light reception face orthogonal to the top face of the socket base 11, and an angle formed by the light reception face with the top face of the first board 10 is 90°. However, this angle is not limited to 90°, but may fall within a range capable of securing a light reception region in the light receiving element with respect to the outgoing light from the optical device.

Further, the cover 12 may include a separate light receiving element 24 and a separate optical filter 25.

In this case, an optical device of a different type, i.e., an optical device in which a contact face 30a of an external connection terminal 30 is positioned on a bottom face of the optical device and a semiconductor laser element 111 emits light upward from a top face of the optical device can be also subjected to a test in which the light receiving element 24 incorporated in the cover 12 measures output of light.

Further, the configuration of the first embodiment and that of the second embodiment may be combined with each other. More specifically, the optical device 200 in which the light emission face of the semiconductor laser element 111 is positioned at an angle of 0° with respect to the contact face 30a of the external connection terminal 30 is subjected to a test in which the light receiving element 14 positioned on a bottom face side of the socket base 11 and mounted on the first board 10 measures output of light. On the other hand, the optical device 300 in which the light emission face of the semiconductor laser element 111 is positioned at an angle of 90° with respect to the contact face 30a of the external connection terminal 30 is subjected to a test in which the light receiving element 14 mounted on the side portion of the socket base 11 measures output of light.

With this configuration, optical devices each having a different positional relation between the position of the contact face 30a of the external connection terminal 30 and the direction of emission of the outgoing light 113 from the semiconductor laser element 111 can be subjected to a test by means of a single tester.

Third Embodiment

Hereinafter, description will be given of a tester for an optical device according to a third embodiment of the present invention with reference to the drawings. Herein, essential components having the similar actions to those described above with reference to FIGS. 11 and 12 as well as those in the first embodiment are denoted by the same reference numerals, and description thereof will not be repeated.

Figure 9:
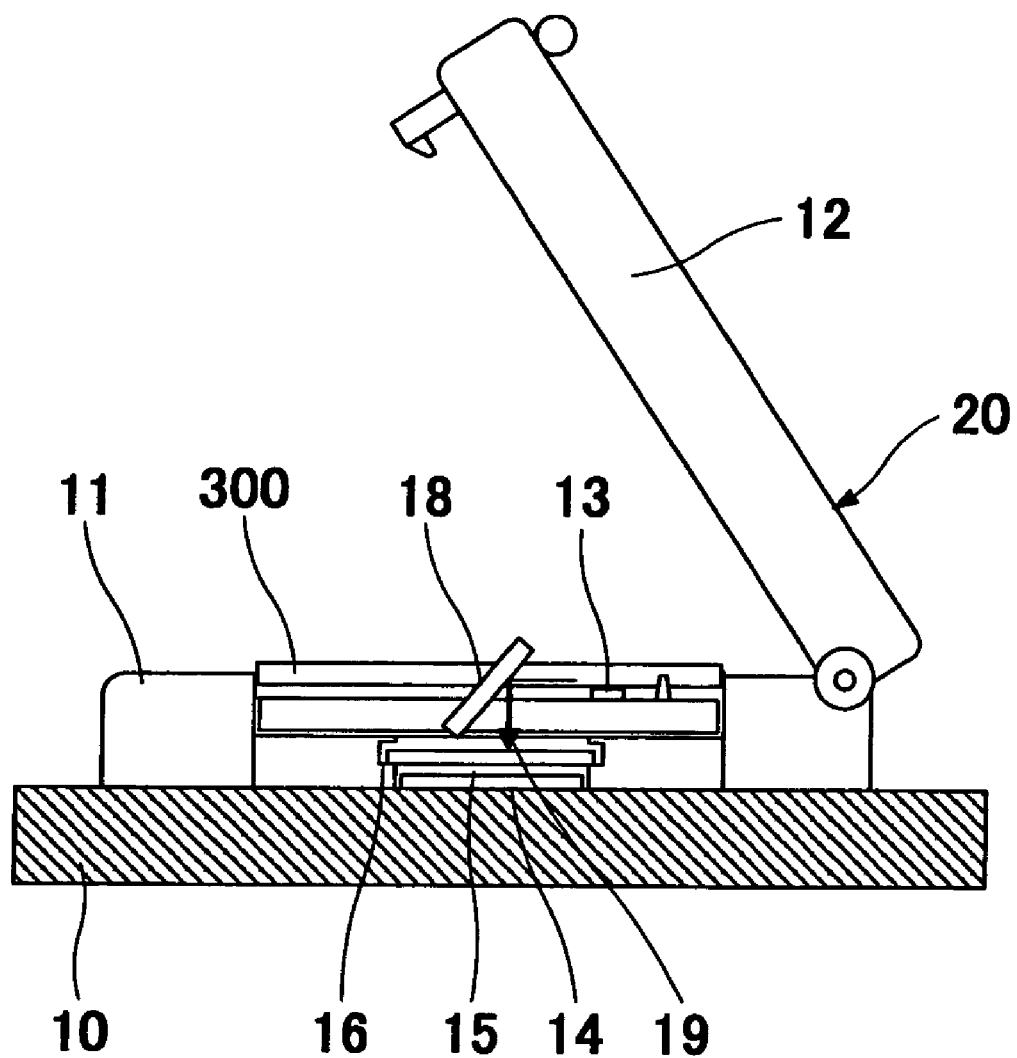
FIG. 9 is a sectional view of a tester for an optical device according to a third embodiment of the present invention.

As illustrated in FIG. 9, the third embodiment is different from the first embodiment in the following point. That is, the socket base 11 includes a mirror 18 reflecting light emitted from the optical device 300. The socket 20 has the light receiving element 14 located on the bottom face side of the socket base 11 and provided on the top face of the first board 10, and the mirror 18 directs a direction of light emitted from the optical device 300 toward the light receiving element 14. More specifically, in the socket base 11, the plate-shaped mirror 18 is attached with an angle of 45° to a position on a center of a light reception region of the light receiving element 14. Herein, the mirror 18 is attachable to/detachable from the socket base 11. In this case, the cover 12 and the lead frame must not interfere with the mirror 18.

In the tester configured as described above, the optical device 300 in which the light emission face of the semiconductor laser element 111 is positioned at an angle of 90° with respect to the contact face 30a of the external connection terminal 30 is placed on the socket base 11.

In the optical device 300, the outgoing light 113 is directed to the mirror 18 and the contact face 30a of the external connection terminal 30 is brought into contact with the terminal 13 provided on the socket base 11. Then, the cover 12 is closed, and the optical device 300 is put in the tester so as to be interposed between the socket base 11 and the cover 12.

The outgoing light 113 emitted from the optical device 300 is reflected by the mirror 18 and, then, travels toward the bottom face of the socket base 11. The optical device 300 is subjected to a test in which the light receiving element 14 mounted on the first board 10 receives a beam 19 reflected from the mirror 18 through the through hole 21 and the optical filter 15 to thereby measure output of light from the optical device 300.

The optical device 200 in which the light emission face of the semiconductor laser element 111 is positioned at an angle of 0° with respect to the contact face 30a of the external connection terminal 30 is subjected to a test in which output of light thereof is measured in a state that the optical device 200 is put in the socket base 11 from which the mirror 18 is detached.

Accordingly, optical devices each having a different positional relation between the contact face 30a of the external connection terminal 30 and the direction of emission of the outgoing light 113 from the semiconductor laser 111 can be subjected to a test by means of a single tester. Besides, this tester can be used in a characteristics inspection step upon manufacturing an optical device.

As illustrated in FIG. 10, a set of the light receiving element 14 and optical filter 15 may be provided in the socket base 11 and receiving element 24 and optical filter 25 may be provided in the socket cover 12, respectively, and the mirror 18 may be of a double-faced reflection type.

In this case, optical devices are arranged in two rows on the lead frame. The optical device of each row emits the outgoing light 113 to the mirror 18. The mirror 18 reflects the outgoing light 113 emitted from one of the optical devices toward the light receiving element 24 and optical filter 25 of the cover 12 and, also, reflects the outgoing light 113 emitted from the other optical device toward the light receiving element 14 and optical filter 15 of the socket base 11. The respective light receiving elements of the cover 12 and socket base 11 receive beams 19 reflected from the mirror 18.

With this configuration, a characteristics test can be simultaneously conducted on the optical devices arranged in two rows on the lead frame, resulting in improvement of productivity.

In the third embodiment, the mirror 18 has a plate shape, but may be formed into a triangular prism shape. In this case, a triangular prism-shaped mirror is attached to the socket base 11 or the cover 12.

Then, optical devices are arranged in two rows on the lead frame. The optical device of each row emits outgoing light 113 toward the triangular prism-shaped mirror. The triangular prism-shaped mirror directs beams of the both optical devices in the same direction, so that a characteristics test can be conducted using the same light receiving element.

In this case, a test is conducted in such a manner that the optical device of one row and the optical device of the other row are allowed to emit light alternately. Consequently, the optical devices of the two rows cannot be subjected to a test at the same time; however, the optical filter 15, the light receiving element 14, a power source for allowing the optical device to emit light, and the like can be used for each test. Therefore, it is possible to suppress increase of cost for a tester.

In the third embodiment, a prism made of glass may be used in stead of the mirror 18, for the purpose of reflecting light.

The first to third embodiment describe the tester having the socket 20 in which plural optical devices can be subjected to a test at the same time; however, the socket 20 may treat only one optical device.

Further, the first embodiment and the second embodiment may be combined with each other and the cover 12 may include a separate light receiving element 24 and a separate optical element 25.

In this case, the optical device 200 in which the light emission face of the semiconductor laser element 111 is positioned at an angle of 0° with respect to the contact face 30a of the external connection terminal 30 is subjected to a test in which the light receiving element 14 mounted on the bottom face side of the socket base 11 measures output of light. On the other hand, the optical device 300 in which the light emission face of the semiconductor laser element 111 is positioned at an angle of 90° with respect to the contact face 30a of the external connection terminal 30 is subjected to a test in which the light receiving element 14 mounted on the side portion of the socket base 11 measures output of light.

Further, an optical device of a different type in which the contact face 30a of the external connection terminal 30 is positioned on the bottom face of the optical device and the semiconductor laser element 111 emits light upward from the top face of the optical device is subjected to a test in which the light receiving element 24 incorporated in the cover 12 measures output of light.

Accordingly, optical devices each having a different positional relation between the position of the contact face 30a of the external connection terminal 30 and the direction of light emission of the semiconductor laser 111 can be subjected to a test by means of a single tester.

The present invention is applicable as a tester for an optical device, including a light receiving element and a laser light emitting element, such as a hologram unit incorporated in an optical pickup.

What is claimed is:

1. A tester for an optical device, comprising:
   a first board;
   a socket mounted on said first board, for having an optical device thereon, said socket comprising a base and a cover;

said socket base comprising a terminal for contacting an external connection terminal of such optical device and having a through hole for allowing light emitted from the optical device to pass therethrough, and the socket base holding an optical filter at a midpoint of the through hole, between the optical device and the light receiving element; and a light receiving element mounted on a top face of the first board at a position corresponding to the through hole of the socket;

wherein the socket base has a second optical filter located on a side portion of the top face thereof, and the first board has a second light receiving element mounted thereon.

2. The tester for an optical device according to claim 1, wherein the socket base has a groove therein for holding therein the second optical filter in detachable manner.

3. The tester for an optical device according to claim 1, wherein the cover comprises a third light receiving element and a third optical filter, each located at a position corresponding to the through hole.

4. The tester for an optical device according to claim 2, wherein the cover comprises a third light receiving element and a third optical filter, each located at a position corresponding to the through hole.

5. A tester for an optical device, comprising:
a first board;
a socket mounted on said first board, for having an optical device thereon, said socket comprising a base and a cover;
said socket base comprising a terminal for contacting an external connection terminal of such optical device and having a through hole for allowing light emitted from the optical device to pass therethrough, and the socket base holding an optical filter at a midpoint of the through hole, between the optical device and the light receiving element; and
a light receiving element mounted on a top face of the first board at a position corresponding to the through hole of the socket;
wherein the socket base has a second optical filter and a second board each placed on a side portion of the top face thereof, the second board has a second light receiving element mounted thereon, and the socket base has a groove therein for holding therein the second optical filter and the second board in a detachable manner.

6. The tester for an optical device according to claim 5, wherein the cover comprises a third light receiving element and a third optical filter, each located at a position corresponding to the through hole.

7. The tester for an optical device according to claim 5, wherein the first board and the second board are electrically connected to each other.

8. A tester for an optical device, comprising:
a first board;
a socket mounted to the first board, for having an optical device thereon, said socket comprising a base and a cover;
said socket base comprising a terminal on its top surface, for contacting an external terminal of an optical device;
said socket base further comprising a groove in a side portion of a top surface of said base;
a second board detachably held in said groove;
a light receiving element mounted on said second board, for measuring an output of light emitted from the optical device; and
an optical filter located between the optical device and the light receiving element and detachably held in said groove.

9. The tester for an optical device according to claim 8, wherein the cover comprises a second light receiving element and a second optical filter.

10. The tester for an optical device according to claim 8, wherein the first board and the second board are electrically connected to each other.

11. A tester for an optical device, comprising;
a first board;
a socket mounted on said first board, for having an optical device thereon, said socket comprising a base and a cover;
said socket base comprising a terminal for contacting an external connection terminal of such optical device and having a through hole for allowing light emitted from the optical device to pass therethrough, and the socket base holding an optical filter at a midpoint of the through hole, between the optical device and the light receiving element; and
a light receiving element mounted on a top face of the first board at a position corresponding to the through hole of the socket;
wherein the cover comprises a second light receiving element and a second optical filter, each located at a position corresponding to the through hole.

12. A tester for an optical device, comprising;
a first board;
a socket mounted on said first board, for having an optical device thereon, said socket comprising a base and a cover;
a top surface of said socket base comprising a terminal for contacting an external connection of such optical device;
a light receiving element mounted on the first board and located at a side portion of the top surface of said socket base for measuring an output of light emitted from the optical device; and
an optical filter located between the optical device and the light receiving element at a side portion of the top surface of the socket base,
wherein the cover comprises a second light receiving element and a second optical filter.

13. A tester for an optical device, comprising;
a first board;
a socket mounted on said first board, for having an optical device thereon, said socket comprising a base and a cover;
a top surface of said socket base comprising a terminal for contacting an external connection of such optical device;
a light receiving element mounted on the first board and located at a side portion of the top surface of said socket base for measuring an output of light emitted from the optical device; and
an optical filter located between the optical device and the light receiving element at a side portion of the top surface of the socket base,
wherein the socket base has a groove therein for holding therein the optical filter in a detachable manner, and the cover comprises a second light receiving element and a second optical filter.

* * * * *